(12) United States Patent
Mahlen et al.

(10) Patent No.: US 9,464,949 B2
(45) Date of Patent: Oct. 11, 2016

(54) WIRE TIMING AND TENSIONING DEVICE

(71) Applicants: Andrew E. Mahlen, Billings, MT (US);
Ali T. Alniemi, Bozeman, MT (US);
Bryan C. King, Billings, MT (US)

(72) Inventors: Andrew E. Mahlen, Billings, MT (US);
Ali T. Alniemi, Bozeman, MT (US);
Bryan C. King, Billings, MT (US)

(*) Notice: Subject to any disclaimer, the term of this patent is extended or adjusted under 35 U.S.C. 154(b) by 751 days.

(21) Appl. No.: 13/857,221

(22) Filed: Apr. 5, 2013

(65) Prior Publication Data
US 2014/0052388 A1 Feb. 20, 2014

Related U.S. Application Data

(60) Provisional application No. 61/686,515, filed on Apr. 6, 2012.

(51) Int. Cl.
*G01L 1/10* (2006.01)
*G01L 5/04* (2006.01)

(52) U.S. Cl.
CPC ........ *G01L 1/10* (2013.01); *G01L 5/042* (2013.01)

(58) Field of Classification Search
CPC .................................. G10L 5/042; G10L 1/10
USPC ................... 702/43; 73/862.4, 862.392, 828; 340/581
See application file for complete search history.

(56) References Cited

U.S. PATENT DOCUMENTS

| | | | | |
|---|---|---|---|---|
| 4,565,099 A | * | 1/1986 | Arnold | G01L 5/042 73/862.41 |
| 4,960,001 A | * | 10/1990 | Vemmer | G01L 5/101 73/862.392 |
| 5,731,528 A | * | 3/1998 | Yamazaki | G01L 5/042 73/828 |
| 8,941,502 B2 | * | 1/2015 | Welch | 340/581 |

FOREIGN PATENT DOCUMENTS

CA 2155077 * 2/1997

* cited by examiner

*Primary Examiner* — Mohamed Charioui
(74) *Attorney, Agent, or Firm* — David B. Waller

(57) ABSTRACT

A "semi-automated" device, method and/or system for the determination of line sag in a tensioned (e.g., power) line is described. A prescribed number of waves based on the waves required by a given sag-tension chart is input. After the device is directly or indirectly attached onto the line, the user then induces a wave on the line either by pulling/striking the tensioned line. The device automatically measures the acceleration/inflection of the passing waves and the time of arrival of waves, as well as ambient temperature, and signaling the user upon completion of the measurement. These recorded values can be used to determine the actual sag of the tensioned line, thus avoiding the current error-prone approach of using a manual stopwatch and visual deflection of the waves.

20 Claims, 7 Drawing Sheets

WIRE TIMING AND TENSIONING DEVICE

CROSS-REFERENCE TO RELATED APPLICATIONS

This patent application claims priority to U.S. Provisional Patent Application No. 61/685,651.5, entitled "Wire Timing and Tensioning Device," filed Apr. 6, 2012, which is hereby incorporated by reference in its entirety for all purposes.

STATEMENT REGARDING FEDERALLY SPONSORED RESEARCH OR DEVELOPMENT

None

INCORPORATION-BY-REFERENCE OF MATERIAL SUBMITTED ON COMPACT DISC

None

BACKGROUND OF THE INVENTION (1) Field of the Invention

This invention is directed to the field of line-tension determination. More particularly, the invention is directed to a self-contained device that automatically determines traveling wave times that can be correlated to line tension for particular span lengths at certain temperatures.

(2) Description of Related Art

In the context of this disclosure, power lines, telephone lines or other tensioned lines or cables or ropes, etc., will be referred to as "lines," without loss of generality. The process of determining the tension of sagging lines, particularly in the industrial arts, is routinely determined by using return wave timing in conjunction with sag-tension charts. Specifically, this approach requires a worker to impact a strung line near the attachment point to generate a traveling wave that will reflect back and forth between two supports. When the line is struck, a stopwatch is started and the elapsed time is recorded once the wave passes the number of times specified on the sag-tension chart. The resulting time is then compared against the sag-tension chart. The sag-tension chart correlates the designed tension for the type of line to the desired temperatures and designed span lengths to yield a resulting sag and tension. This tension is then compared against an engineered value provided by the engineer and the line is either tightened or slacked until the time recorded closely matches the corresponding time in the sag-tension chart. This method usually takes multiple people and the results are subject to inaccuracies due to obvious operator error.

Given that this is the standard used in the industry for the last hundred years (specifically, power lines), more modern methods and systems are desired that eliminate human error and increase efficiency without vastly changing the commonly practiced method of using the wave-return method to accurately determine line sag and/or tension. Details of such new method(s) and system(s) are provided in the following description.

BRIEF SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a semi-automated method for determining the wave return time of a tensioned line correlated to sag-tension charts is provided, comprising the steps of: attaching an electronic wave return time determining device to the tensioned line; automatically determining an ambient temperature via the electronic wave return time determining device; inputting a fixed number of mechanical waves for the electronic wave return time determining device; automatically detecting an initial inducement of a mechanical wave on the tensioned line via the electronic wave return time determining device; automatically detecting a plurality of at least one of a maximum acceleration and reversal of acceleration of the tensioned line via the electronic wave return time determining device, wherein the automatic detecting is triggered upon passing a pre-determined delay threshold; automatically calculating a total time delay for the fixed number of mechanical waves; and calculating a line sag based on a sag-tension chart for the tensioned line.

In another aspect of the disclosed embodiments, a semi-automated system determining the wave return time of a tensioned line is provided, comprising: means for attaching an electronic wave return time determining device to the tensioned line; means for automatically determining an ambient temperature via the electronic wave return time determining device; means for determining a fixed number of mechanical waves for the electronic wave return time determining device; means for inducing a mechanical wave on the tensioned line; means for automatically detecting an initial inducement of the mechanical wave on the tensioned line via the electronic wave return time determining device; means for automatically detecting a plurality of at least one of a maximum acceleration and reversal of acceleration of the tensioned line via the electronic wave return time determining device; means for automatically calculating a total time delay for the fixed number of mechanical waves; and means for calculating a sag and tension for the tensioned line from a sag-tension chart based on an ambient temperature.

In yet another aspect of the disclosed embodiments, an electronic wave return time determining device for measuring the return wave time of a tensioned lined is provided, comprising: a housing having at least one attachment mechanism for affixing the electronic wave return time determining device to a tensioned line or a hot line stick; a plurality of electrical devices environmentally protected by the housing, the electrical devices comprising: a display; a keypad; an accelerometer; a timer; a temperature sensor; a sound generator; a power source to the sound generator, the temperature sensor, the timer, the accelerator, the keypad, and the display; and a processor powered by the power source signal connected to the display, keypad, accelerometer, timer, temperature sensor and sound generator, wherein the processor contains computer instructions to calculate a total time delay of an induced mechanical wave in the tensioned line by detecting a plurality of at least one of a maximum acceleration and reversal of acceleration of the tensioned line.

DETAILED DESCRIPTION

The exemplary device described herein enables the "automatic" or device-assisted detection of the amount of sag in a tensioned line by generally using the return wave method. In operation, the electronic wave return time determining device is "configured" to a prescribed number of waves based on the waves required by a given sag-tension chart. The exemplary device is then affixed or clamped directly onto the line, or otherwise connected, for example, to an intermediate object such as a hotline stick. The user then perturbs/induces a wave on the line either by pulling on the hotline stick, directly striking the line, or other means if the user desires. Alternately, in some embodiments, the exemplary device may have a means or mechanism for inducing a shock wave on the attached line (e.g., acoustic, mechanical, vibratory, etc.).

The exemplary device can use an accelerometer to automatically activate a timer once a wave is induced on the tensioned line. The exemplary embodiment(s) records the time between consecutive return waves and displays the total time between the number of return waves (the amount or number of return waves can be user-specified or self-determined). This time is then recorded by the user and compared to the return wave sag-tension chart. Based on whether the time is less than or greater than the time on the return wave sag-tension chart for a given line characteristic, the line is then tensioned tighter or slacked and the process is repeated until the line is sagged to a time that is deemed adequate per the temperature and the return wave sag-tension chart. In some embodiments, the return wave sag-tension chart information (including line characteristic(s)) may be stored in the exemplary device. Additionally, the temperature can be measured on the exemplary device for the user to record. In various embodiments, the exemplary device will have the capability to interface with several clamping mechanisms, as a user convenience. The exemplary device contains electronics capable of measuring time, temperature, and movement, all of which are enclosed in a compact enclosure (may be weather resistant) that is easily attachable to a tensioned line.

Figure 1:
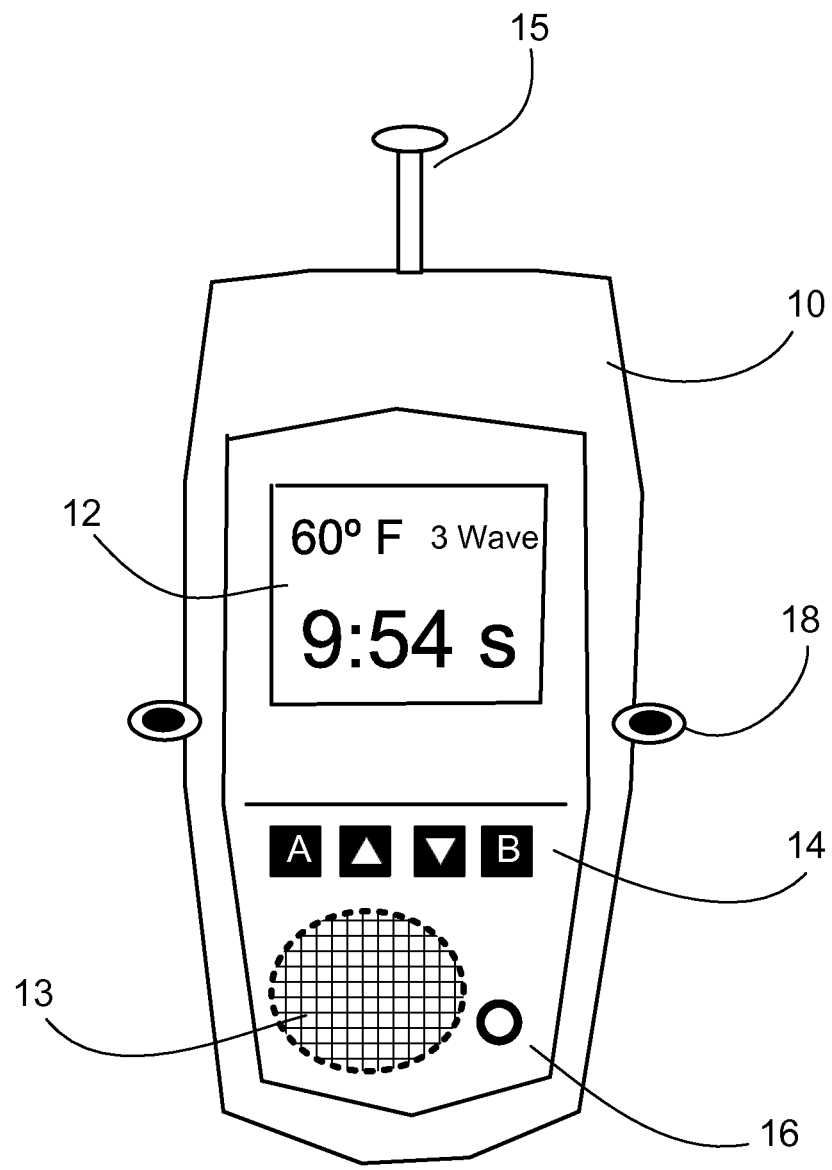
FIG. 1 is an illustration of one of many possible form factors for an exemplary electronic wave return time determining device.

FIG. 1 is an illustration of one of many possible form factors for an exemplary electronic wave return time determining device. For example, a robust (or environmentally secure) housing 10 contains electronics (not shown) with a display 12 that shows the time elapsed, the temperature and number of waves to measure, as possible display elements. Control buttons 14 and a power on/off button 16 are provided with the exemplary device and in some embodiments, an optional speaker 13 may be provided internal to the housing 10. At the top of the exemplary device, mounting/hanging/attachments 18 are provided to allow the exemplary device to be attached at the housing 10. Element 15 disposed between mounting elements 18 may be a hanger for suspending the exemplary device directly to a tensioned line. Of course, the various shapes and positions of the mounting element 18 and element/hanger 15 may be varied, according to design preference.

Generally, the exemplary device will be sized and shaped such that single or dual handed operation can be conveniently executed. That is, the exemplary device will be portable. Various other embodiments of the exemplary device may have multiple displays, full keyboards, wired/wireless connectivity options, and data storage capabilities, for example. In use, the exemplary device is attached directly or indirectly to a tensioned line such that it may detect any physical oscillations and waves occurring on the line.

Figure 2:
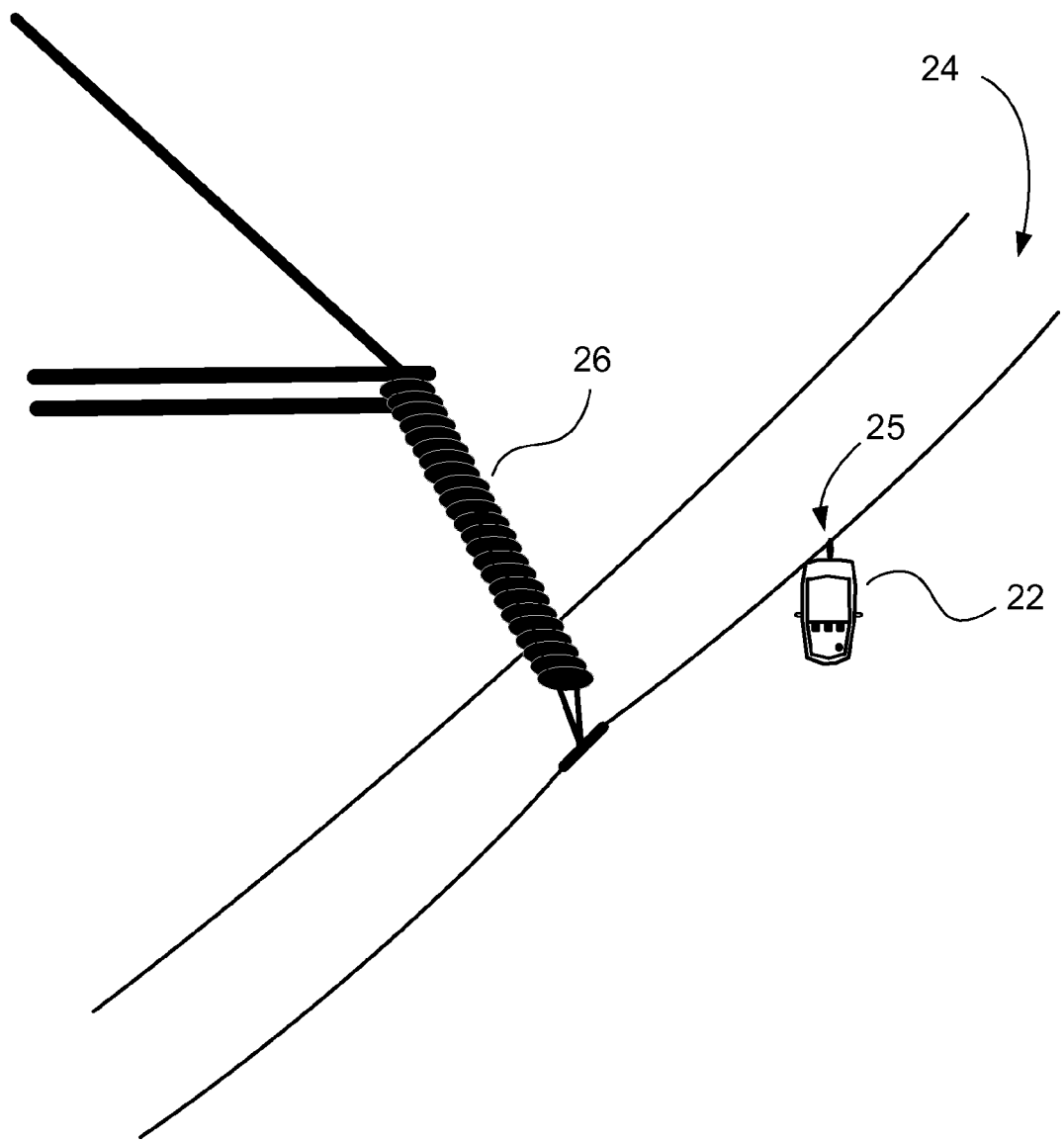
FIG. 2 is an illustration of one exemplary scenario where the exemplary device is directly attached to a power line.

FIG. 2 is an illustration of one exemplary scenario where the exemplary device 22 is directly affixed to a stretch of tensioned power line 24 that is supported by power line insulator/connector 26. In this example, the exemplary device 22 is attached to line 24 via a center hanger 25 at the top of the exemplary device 22. Of course, other possible methods to hang/affix the exemplary device 22 are understood to be within the spirit and scope of this disclosure.

Figure 3:
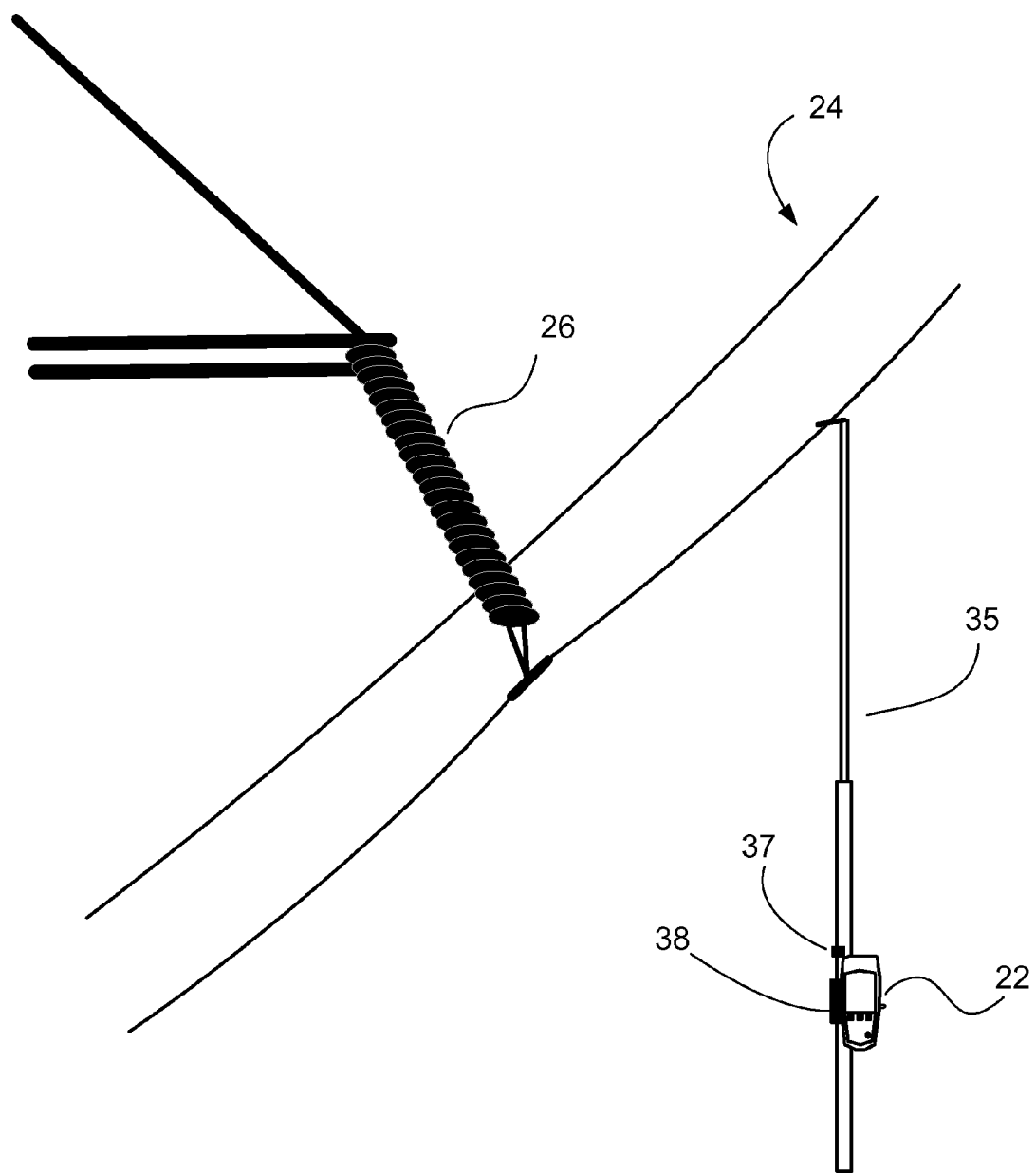
FIG. 3 is an illustration of another exemplary scenario where the exemplary device is coupled to a power line via a hotline stick.

FIG. 3 is an illustration of another exemplary scenario where the exemplary device 22 is coupled to a tensioned power line 24 via, what is called in the power industry, a hotline stick 35. The device 22 is attached to the hotline stick 35 via any one of attachment sleeve/clamp/etc. located at different portions of the exemplary device 22 as shown, for example, by elements 37 and/or 38. This particular scenario reduces the need for the technician to "directly" attach the exemplary device 22 to the tensioned power line 24. The safety advantages of such an approach are self-evident.

As is apparent to one of ordinary skill in the art, other methods of aftermarket attachment may exist and the exemplary device may be configured, as desired, to have the capability to interface with aftermarket attachment technologies.

It should be noted that FIGS. 2 and 3 show the exemplary device 22 a "distance" away from the fixed/connected end of the tensioned power line 24. It is understood in the power industry that when a wave reflection test is performed, at least five (5) feet of separation from the end of the line is needed to allow noticeable fluctuation of the line. To comport with industry practice, the exemplary device 22 may similarly be placed approximately five (5) feet from the end of the line. However, based on the sensitivity of the exemplary device 22, and amount of tension in the line, the separation distance may be less or more.

Figure 4:
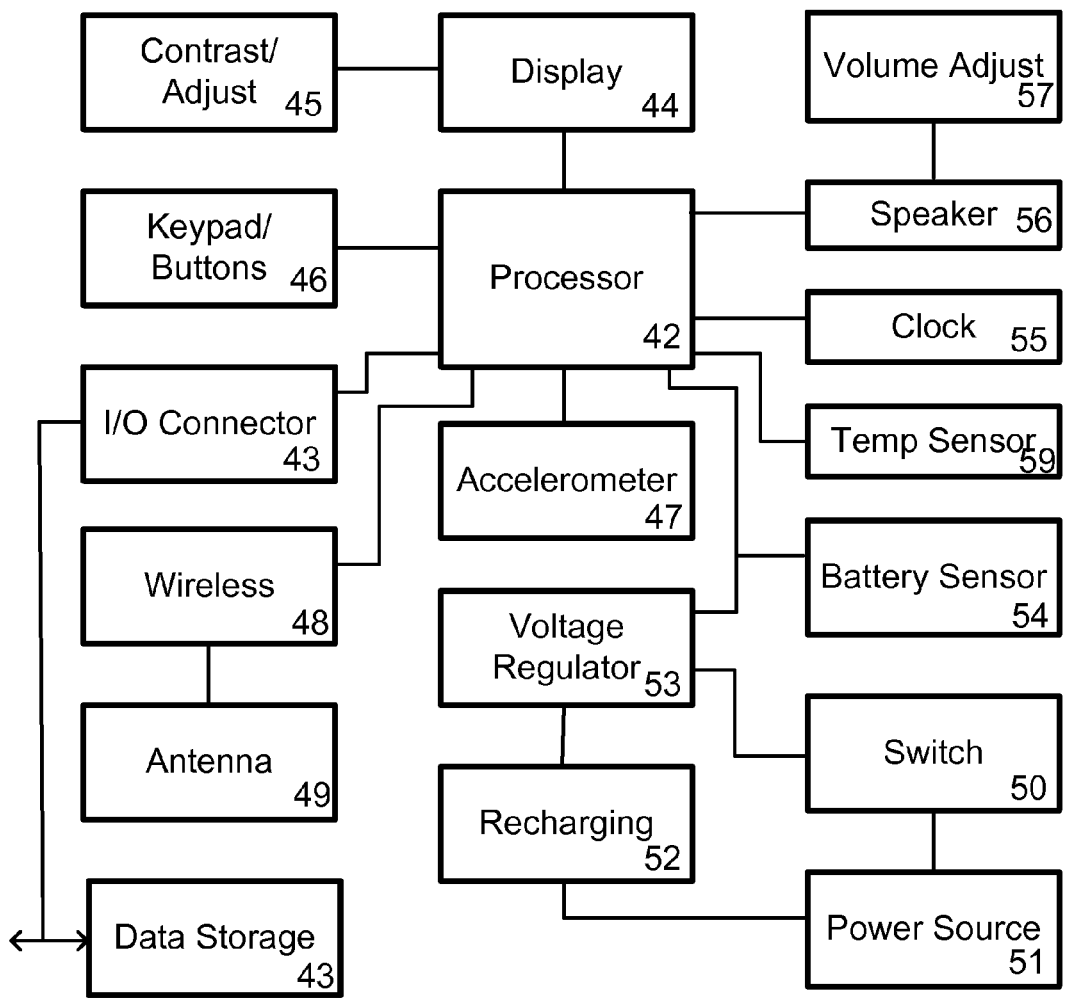
FIG. 4 is a hardware block diagram for an exemplary device.

FIG. 4 is a hardware block diagram for an exemplary device, illustrating various hardware elements (some that are optional) that may be used in the manufacture of the exemplary device. Processor 42 (or micro-controller) contains code/instructions for bootstrapping the device subsystems, calculating line tension parameters and control/receipt of data from various other elements. Display 44 provides visual feedback to the user (with contrast/brightness adjustment 45 capabilities), manual input/control is provided via keypad/buttons 46, and accelerometer 47 senses the displacement of the exemplary device during a wave cycle. In a prototype fabricated by the inventors, a Freescale's MC9S08SH8CWJ micro-controller was used for processor 42, generic model EADOGM162L was used for display 44, and Freescale's MMA8452Q accelerometer was used for accelerometer 47. Of course, other comparable devices may be used without departing from the spirit and scope of this disclosure.

I/O connector 43 enables input/output of signals to, for example, optional wireless module 48 which in turn transmits its data via antenna 49. I/O connector 43 may also interface between the processor 42 and other devices, such as, for example, data storage system 43 which may be onboard or off board. Power is provided to the various elements via a switch 50 that turns on power from power source 51. The power source 51 may be recharged by recharging unit 52 which may require a voltage regulator 53 which operates in tandem with power source power level sensor 54. Clock 55 may be part of the processor 42 or separate and provides timing/clocking information, as needed. Speaker 56 (or buzzer) may provide audible cues for a user and may be volume-adjusted by volume control 57.

As stated above, various elements described above may be optional, depending on implementation preference. Moreover, some of the elements may be combined into single elements and some of the connections shown between the various elements may be altered. As one of many possible examples, the speaker 56 may not be needed (as well as volume control 57). In other embodiments, a wireless connectivity may be eliminated to reduce costs, wherein the data storage system may act as a logger and provide visual feedback to the user via display 44. Accordingly, it is understood that one of ordinary skill in the art may modify the list of elements described above to remove and/or include other functional elements, without departing from the spirit and scope of this disclosure. Therefore, while FIG. 4 illustrates discrete hardware elements, it is understood that various one or more hardware elements may be combined, as according to design/engineering preference.

Figure 5:
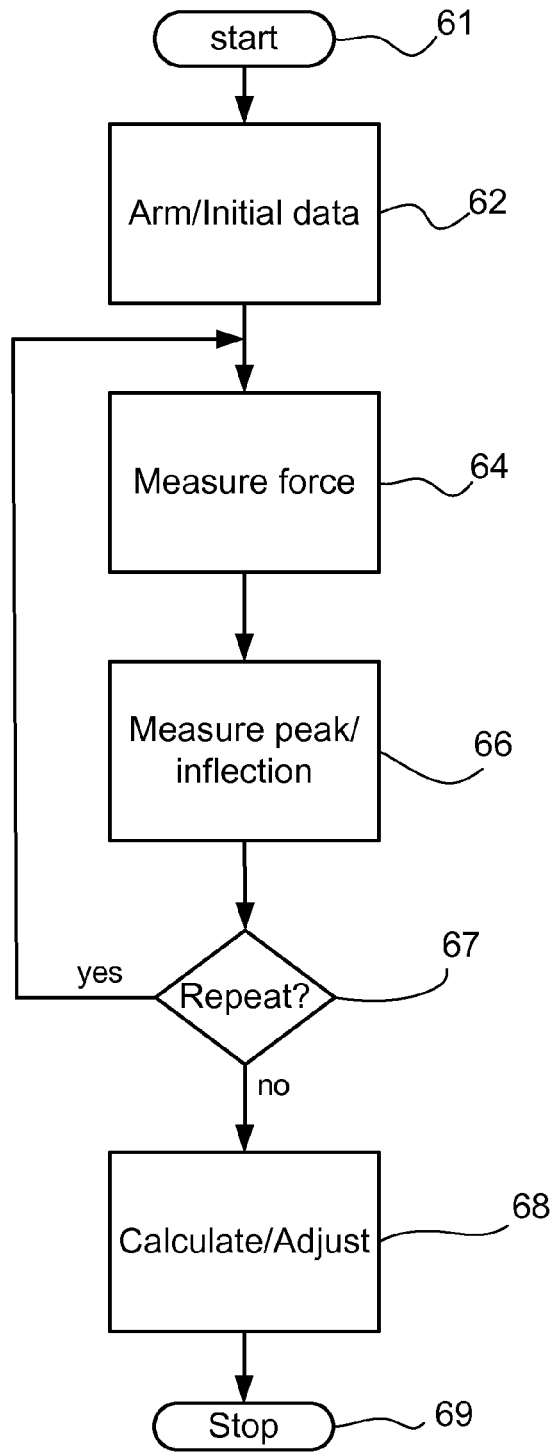
FIG. 5 is a flowchart showing one possible exemplary process of operation of the exemplary device.

FIG. 5 is a flowchart showing one possible exemplary process 60 of operation of the exemplary device. The exemplary process 60 starts 61 with arming 62 the device. The arming process 62 may include initial data input, for example, the total number of waves, the temperature, and other desired data. Next, upon arming 62, the accelerometer will measure force 64 (or an equivalent thereto, such as change in force, magnitude, direction, etc.). The exemplary device may utilize a timed delay or choose to ignore some period of the initial movement or provide other software based filtering scheme, to avoid false detection or non-harmonic movement that may occur during the initial and successive triggers.

Upon initiation of the measurement of force 64, peak or inflection 66 of the force (i.e., the movement of the exemplary device) is measured. Upon valid measurement 66, the exemplary process 60 performs a check 67 to see if it needs to repeat the above cycle, for example, to perform an averaging (or, alternatively, if error checking determines that the measured value is out of bounds). If the initial data 62 has not been met (e.g., number of desired waves is set to 3 but number of detected waves is only 1), then the check 67 repeats the latter cycle in the preceding paragraph.

It should be noted that one of ordinary skill in the art will recognize that it is not necessary to be limited to measuring the "peak" or "inflection" 66 as an indicator of a passing wave, as any fixed point on a standing/traveling wave can operate as a time-of-arrival measuring point. Accordingly, while the exemplary embodiments and processes described herein use the term peak or inflection, it is understood any fixed point (fixed in the longitudinal direction) on a line that experiences a "change" in elevation from the passage of a wave can be used, the inflection or peak referring to the local change of direction.

If the check 67 determines that the maximum number of cycles has been met, then the exemplary process 60 proceeds to calculation step 68 to determine the total wave propagation delay or, in higher end models, tension line/sag. Adjustments for temperature, previous stored data, cable type, and other factors may come into the calculation, as needed. Also, some measure of pass/fail criteria may be implemented, if so desired. After step 68, the exemplary process 60 stops 69.

Figure 6:
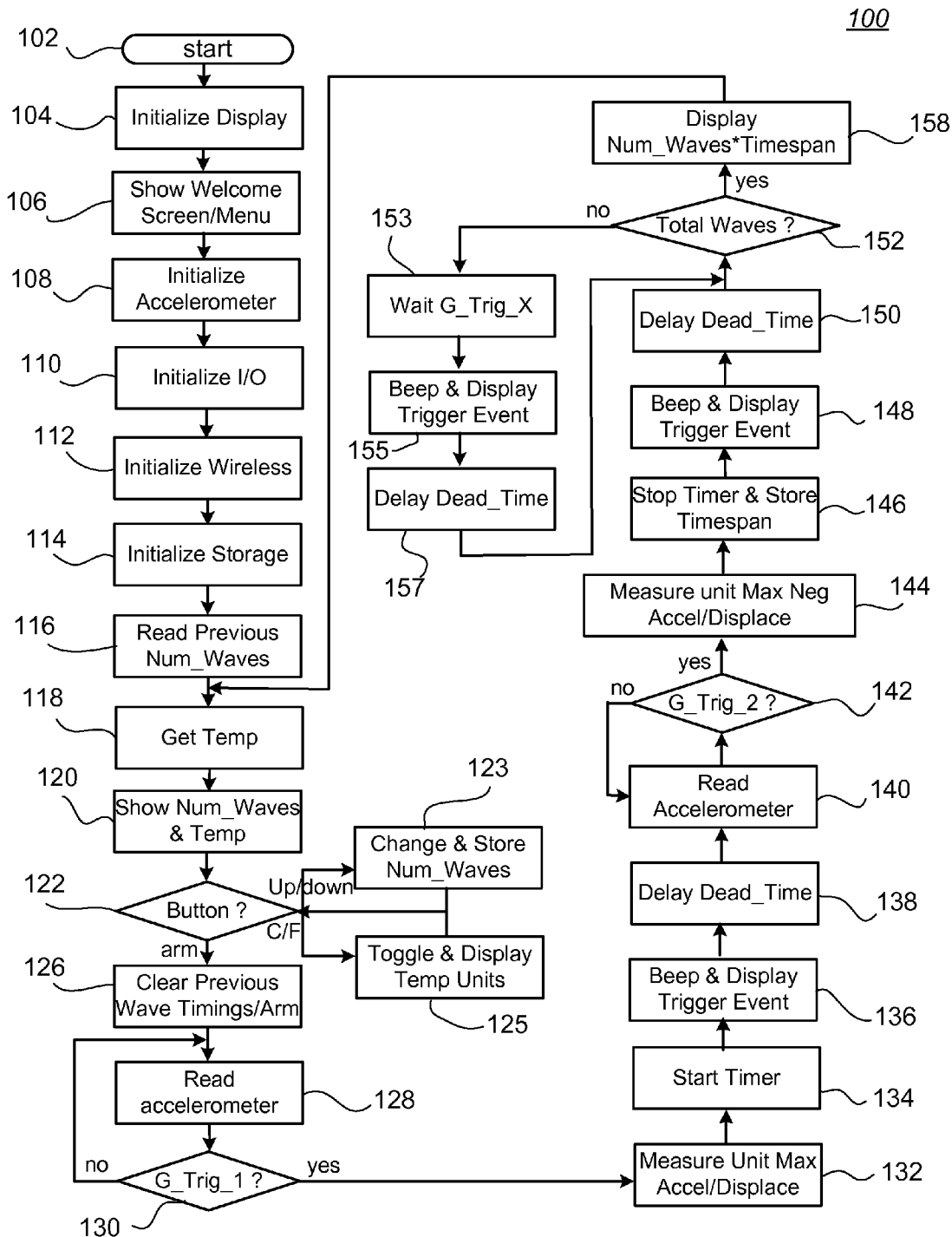
FIG. 6 is another flowchart illustrating another exemplary process.

FIG. 6 is flowchart illustrating another exemplary process 100 with numerous added variations and details for calculating the line tension. The exemplary process 100 starts 102 with powering on the exemplary device, which will trigger a series of initialization routines, for example, the initialization of the display 104, which may provide an optional welcome screen 106. Further initialization steps can include calibration/initialization of the accelerometer 108 (or equivalent force/direction measuring device), initializing (if needed) the I/O 110, initializing the wireless (if used) system 112, and initializing storage 114 (if needed). After initialization, the previous selected number of waves 116 (if available) can be read from storage, noting that storage initialization step 114 will not occur if a valid previous Num_Waves is stored in storage. The previous selected number of waves 116 can act as a default value to be used by the exemplary device.

Next, the ambient temperature is read 118 and displayed 120 to the user with the valid previous Num_Waves. If the user presses the Temp/Num_Waves button(s) 112, the user may allow modification of these values. For example, the user may change the default Num_Waves 123 by increasing or decreasing the value. Similarly, the user may change the temperature reading from Celsius to Fahrenheit or other features of the temperature reading 118.

When the user presses an "arm" button, then the exemplary process 100 proceeds to erase/remove the previous wave timing measurements. In essence, the exemplary device begins a "new" measurement session using the stored and displayed Num_Waves 116 read from storage. In some exemplary device(s), the arm button action may be remotely triggered.

At the completion of step 126, the exemplary device is ready to start detecting "movement" from waves traveling down the line. Accordingly, the exemplary device is presumably attached to the respective tensioned line either prior to this point or at this point. In beginning a new measurement, the exemplary process 100 takes a reading of the accelerometer 128. If the amount of movement or force detected exceeds 130 a value designated as G_Trig_1, then the exemplary process 100 proceeds to measure the maximum acceleration 132, noting the direction of the initial force, which is considered "positive" for the purposes of this disclosure. The effect of the G_Trig_1 to provide a minimum threshold for "starting" actual measurement. For example, in one scenario, the G_Trig_1 value can be set to 1.5 times the force of gravity. The exact value for G_Trig_1 is adjustable and may vary due to differences in line weights and lengths and the ability for the user to induce a powerful wave. It is noted that the exemplary process 100 is not limited to force measurement along one axis only. That is, depending on implementation design and preference, a 2-D (2-axis) or 3-D (3-axis) measurement of force can be made. Measuring all three axes compensates for when the exemplary device is installed crooked or the wave is induced at an awkward angle. It is also noted that the detection of a traveling wave may be by absolute acceleration or a change in acceleration.

Once G_Trig_1 has been detected, the exemplary process 100 enters a timer routine 134 and provides a confirmation of trigger event detection 136—shown in this example as a beep and visual display indication. Dead_Time delay 138 can be instituted into the timer 134 to prevent or ignore reading of the accelerometer after the initial maximum detected value to avoid detection of harmonics. This is necessary because an induced wave actually consists of several oscillations, each of which can trip the accelerometer at the wrong time. Once the Dead_Time has passed, the exemplary process 100 will scan the accelerometer 140 for a force larger than G_Trig_2 in the negative direction, which correlates to the return wave. G_Trig_2 is smaller than G_Trig_1 to take into account for the wave losing energy and attenuating over time.

Next, a comparison of the detected value to G_Trig_2 is made 142 and if it is "below" the threshold of G_Trig_2, then the exemplary process 100 will loop back to re-measure the accelerator 140. This continues until G_Trig_2 has been exceeded upon which the Max Negative Accel is measured 144. Once the peak has been detected the exemplary process 100 will stop the timer and record the duration as the Timespan 146 and alert 148 the user as before.

The exemplary process 100 continues with a Delay Dead_Time 150, which may be the same or less than the Delay Dead_Time 138 encountered previously. An assessment of the total number of waves encountered is performed in step 152. If the total number has been met, then a computation is performed Num_Wave*Timespan for displaying Total_Timespan 158. If the total number of waves has not been met, then the next G_Trig_X value 153 and similar notification & delay steps 155, 157 are implemented. The exemplary process 100 will continue to detect waves that exceed the G_Trig_X force value and alert the user until the total number of waves have been detected 152.

After step 158, the exemplary process 100 may still continue to collect timings on consecutive return waves and beep on each return wave as an aid to the user and as internal verification of the initial calculation. If for any reason the exemplary process 100 was not able to determine timing it will display an appropriate error message to the user.

The operation of an exemplary device can be briefly stated in the following steps, understanding that some elements/steps may be expanded and/or combined with other steps, and that some steps may be optional, depending on the accuracy and preferences chosen by the user. The exemplary device is operated by first turning it on via the power button. Once on, the exemplary device can continually display the measured ambient temperature in a dedicated area of the screen. The user may change the units of the displayed temperature with the press of a button. The user may modify the desired number of waves to measure with the press of a button. Once the temperature and wave settings are setup to the users liking, the user will attach the exemplary device to the tensioned line. The user next arms the exemplary device via the press of a button. Note higher end models may allow for remote arming. The user then induces a wave on the line. The exemplary device will notify the user each time a wave has been detected. This occurs until the desired number of waves has been detected. The exemplary device will then display the calculated timing for the user to compare against the sagging charts. At this point the user may re-arm the exemplary device with the press of a button and repeat the measurements without having to power cycle if desired.

In performing the above procedures, the exemplary device/process may utilize some or all of the following equations from RUS Bulletin 1726 to calculate tension and sag:

Conductor Sag in Inches $D=48.3*[T/(2*N)]^2$

Figure 7:
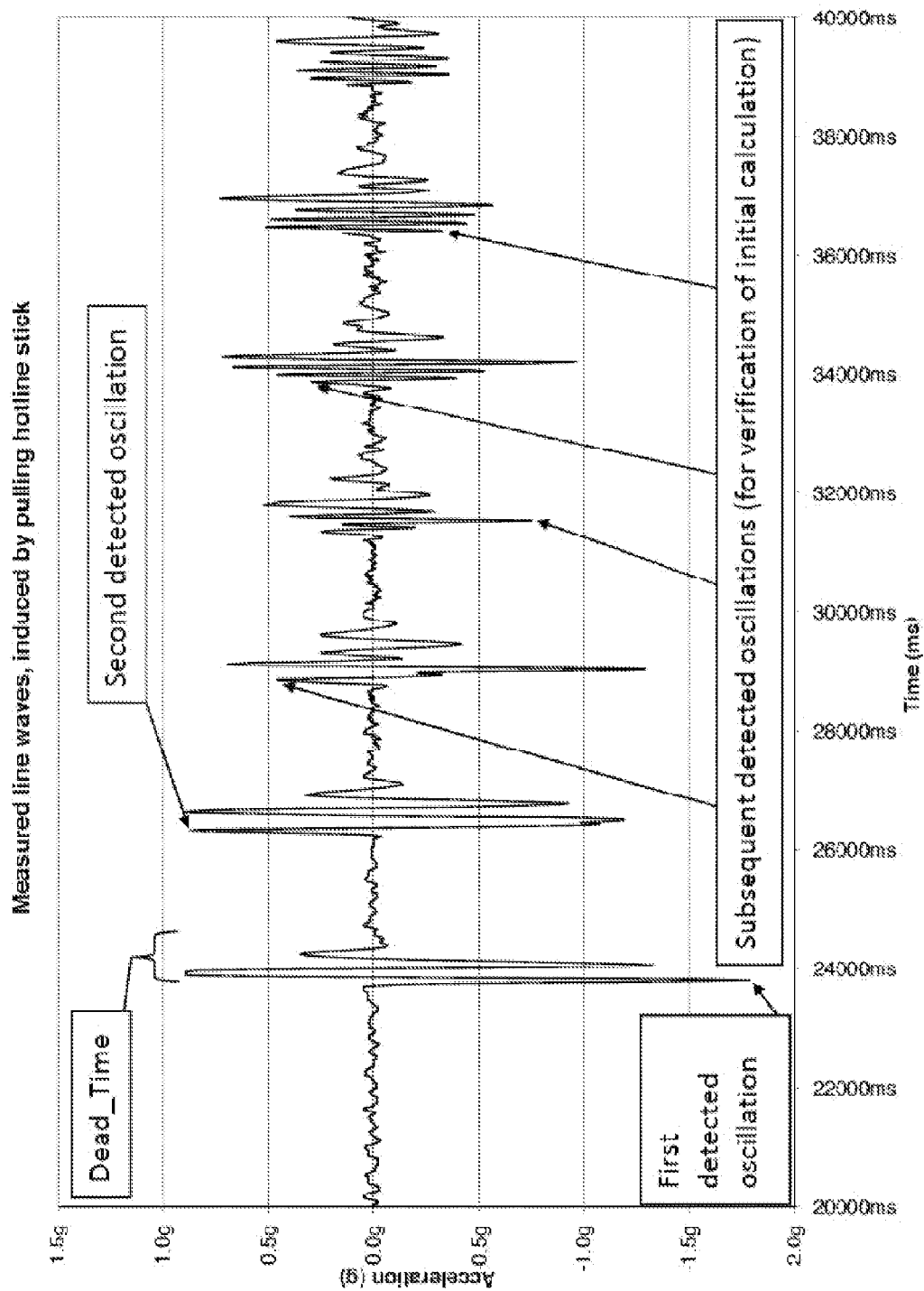
FIG. 7 is a plot of measured acceleration values over a period of time from a pull event on a tensioned line.

T=Time in Seconds
N=Number of Return Waves Counted
$D=[w_c*L^2)/(8*T_h)]/12$
L=Span Length in Feet
$T_h$=Horizontal Tension in Pounds
$w_c$=Unit Weight of Conductor FIG. 7 is a plot of measured acceleration values over a period of time from a pull event on a tensioned power line. The oscillatory nature of the tensioned line and the time lags between the wave events is clearly seen in this plot. Several of the parameters mentioned in FIG. 6 are shown here by way of example. It is noted that this plot is only one possible behavior response, recognizing that different lines will have different characteristics. Accordingly, depending on the line to be measured/detected, the plot characteristics will vary from that seen in FIG. 7.

Various features that have not been discussed above (and some that may have already been discussed) may be added to the exemplary device, such as (whereas in the following the "/" slash character represents and/or): a reset/arming button; a button that toggles between Celsius, Fahrenheit, and Kelvin temperature display modes; a button/slider/knob that increases/decreases the user desired number of waves; a button/slider/knob that increases/decreases display contrast; a button/slider/knob that increases/decreases audio volume; a grayscale/color/touchscreen/backlight display; menu and entry navigation buttons/keys; alphabetic/numeric keypad; a button or switch that enables/disables wireless access; a view of used, available, and total storage space; a view of number of total and detected wave; a view showing arming status, battery level and low battery indicator; audible beeps of programmable frequencies to indicate various alerts and notifications; LEDs to indicate various alerts and notifications; and/or weatherproof enclosure. In addition, other elements that may be incorporated into the device include for example, a laser distance measurement system, a global positioning system (GPS), a mic for voice activation, a wind meter and/or a line temperature sensor.

Additionally, I/O interface items such as the following may be utilized in the exemplary device: a USB mini/micro port; IR/Bluetooth transceiver; proprietary debug port; external RTD temperature sensor port; external thermistor temperature sensor port.

Power for the exemplary device can be obtained from a battery/solar system and may include the following capabilities: power/battery monitoring circuitry; ability to measure the time of day, time between waves; computer connectivity; arming via wireless FOB. Data transfer modes are also contemplated including: the transfer of data wirelessly via Bluetooth; data wirelessly via IR; via Wi-Fi; via cellular, via USB cable; via Serial cable and/or proprietary cable(s). Further, modes of calibration and data charts are also contemplated, for example, for input and display of calibration constants; input and display of algorithm variables; sagging chart information; number of desired waves; desired tension; desired timing; conductor type; conductor sag/unit weight; internal database of various line parameters; and/or firmware updates.

Therefore, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A semi-automated method for determining the wave return time of a tensioned line correlated to sag-tension charts, comprising the steps of:
    attaching an electronic wave return time determining device to the tensioned line, said device comprising:
        a housing having at least one attachment mechanism for affixing the electronic wave return time determining device to a tensioned line or a hot line stick;
        a plurality of electrical devices environmentally protected by the housing, the electrical devices comprising:
            a display;
            a keypad;
            an accelerometer;
            a timer;
            a temperature sensor;
            a sound generator;
            a power source to the sound generator, the temperature sensor; the timer, the accelerator, the keypad, and the display; and
            a processor powered by the power source signal connected to the display, keypad, accelerometer, timer, temperature sensor and sound generator, wherein the processor contains computer instructions to calculate a total time delay of an induced mechanical wave in the tensioned line by detecting a plurality of at least one of a maximum acceleration and reversal of acceleration of the tensioned line;
    automatically determining an ambient temperature via the electronic wave return time determining device;
    inputting a fixed number of mechanical waves for the electronic wave return time determining device;
    automatically detecting an initial inducement of a mechanical wave on the tensioned line via the electronic wave return time determining device;
    automatically detecting a plurality of at least one of a maximum acceleration of the induced mechanical wave and reversal of acceleration of the induced mechanical wave on the tensioned line via the electronic wave return time determining device, wherein the automatic detecting is triggered upon passing a pre-determined delay threshold;
    automatically calculating a total time delay for the fixed number of mechanical waves from the induced mechanical wave on the tensioned line; and
    calculating a line sag using the total time delay obtained from a sag-tension chart for the tensioned line.

2. The method of claim 1, wherein the pre-determined delay threshold is a plurality of different pre-determined delay thresholds.

3. The method of claim 2, wherein the detection of the at least one of the maximum acceleration and reversal of acceleration of the tensioned line is subsequent to a pre-determined delay threshold.

4. The method of claim 1, further comprising, automatically indicating to a user, via the electronic wave return time determining device, at least one time delay for the fixed number of mechanical waves and a completion of measurement.

5. The method of claim 1, further comprising, inputting a tensioned line characteristic into the electronic wave return time determining device.

6. The method of claim 1, further comprising arming the electronic wave return time determining device for operation.

7. The method of claim 1, further comprising, automatically signaling an error condition when the electronic wave return time determining device is unable to calculate a total time delay for the fixed number of mechanical waves.

8. A semi-automated system for determining the wave return time of a tensioned line, comprising:
    means for attaching an electronic wave return time determining device to the tensioned line, said device comprising:
        a housing having at least one attachment mechanism for affixing the electronic wave return time determining device to a tensioned line or a hot line stick;
        a plurality of electrical devices environmentally protected by the housing, the electrical devices comprising:
            a display;
            a keypad;
            an accelerometer;
            a timer;
            a temperature sensor;
            a sound generator;
            a power source to the sound generator, the temperature sensor, the timer, the accelerator, the keypad, and the display; and
            a processor powered by the power source signal connected to the display, keypad, accelerometer, timer, temperature sensor and sound generator, wherein the processor contains computer instructions to calculate a total time delay of an induced mechanical wave in the tensioned line by detecting a plurality of at least one of a maximum acceleration and reversal of acceleration of the tensioned line;
    means for automatically determining an ambient temperature via the electronic wave return time determining device;
    means for determining a fixed number of mechanical waves for the electronic wave return time determining device;
    means for inducing a mechanical wave on the tensioned line;
    means for automatically detecting an initial inducement of the mechanical wave on the tensioned line via the electronic wave return time determining device;
    means for automatically detecting a plurality of at least one of a maximum acceleration of the induced mechanical wave and reversal of acceleration of the induced mechanical wave on the tensioned line via the electronic wave return time determining device;
    means for automatically calculating a total time delay for the fixed number of mechanical waves from the induced mechanical wave on the tensioned line; and
    means for calculating a sag and tension for the tensioned line using the total time delay obtained from a sag-tension chart based on an ambient temperature.

9. An electronic wave return time determining device for measuring the return wave time of a tensioned lined, comprising:
    a housing having at least one attachment mechanism for affixing the electronic wave return time determining device to a tensioned line or a hot line stick;

a plurality of electrical devices environmentally protected by the housing, the electrical devices comprising:
  a display;
  a keypad;
  an accelerometer;
  a timer;
  a temperature sensor;
  a sound generator;
  a power source to the sound generator, the temperature sensor, the timer, the accelerator, the keypad, and the display; and
  a processor powered by the power source signal connected to the display, keypad, accelerometer, timer, temperature sensor and sound generator, wherein the processor contains computer instructions to calculate a total time delay of an induced mechanical wave in the tensioned line by detecting a plurality of at least one of a maximum acceleration and reversal of acceleration of the tensioned line.

10. The device of claim 9, further comprising, computer instructions for calculating sag based on the total time delay, a detected temperature, and a sag chart for the tensioned line.

11. The device of claim 10, wherein the computer instructions for calculating sag further comprise, a pre-determined delay threshold.

12. The device of claim 11, wherein the computer instructions for calculating sag further comprise, measurement of at least one of a maximum acceleration and reversal of acceleration of the tensioned line subsequent to the pre-determined delay threshold.

13. The device of claim 10, wherein the computer instructions include instructions to signal via a sound from the speaker at least one of a detected wave and a completion of measurement.

14. The device of claim 10, wherein the computer instructions for calculating sag further comprise tensioned line characteristic data.

15. The device of claim 9, further comprising, at least one of a power source power level sensor and a voltage regulator, connected to the power source.

16. The device of claim 9, further comprising, a data storage system.

17. The device of claim 9, further comprising, an external I/O connector connected to the processor.

18. The device of claim 9, further comprising, a wireless communication module connected to the processor.

19. The device of claim 18, wherein the wireless communication module is at least one of a Bluetooth, Wi-Fi, and cellular capability.

20. The device of claim 9, wherein the power source is a rechargeable battery.

* * * * *